United States Patent [19]

Bürger et al.

[11] 4,409,119

[45] Oct. 11, 1983

[54] PROCESS FOR REGENERATING CLEANING SOLUTIONS

[75] Inventors: Helga Bürger, Erkrath; Christian Rossmann, Langenfeld, both of Fed. Rep. of Germany

[73] Assignee: Henkel Kommanditgesellschaft Auf Aktien, Duesseldorf-Holthausen, Fed. Rep. of Germany

[21] Appl. No.: 371,289

[22] Filed: Apr. 23, 1982

[30] Foreign Application Priority Data

Sep. 19, 1981 [DE] Fed. Rep. of Germany ....... 3137340

[51] Int. Cl.$^3$ .......................... C11D 7/02; C11D 7/14
[52] U.S. Cl. .................................... 252/156; 252/135; 252/139; 134/10; 134/13; 210/708; 210/906; 210/723
[58] Field of Search ...................... 252/156, 135, 139; 134/10, 13; 210/708, 906, 723

[56] References Cited

U.S. PATENT DOCUMENTS

| 2,980,608 | 4/1961 | Johnson | 210/723 |
| 3,983,033 | 9/1976 | de Latour | 210/906 |
| 4,229,295 | 10/1980 | Krofchak | 210/723 |
| 4,267,058 | 5/1981 | Kyri et al. | 210/906 |

FOREIGN PATENT DOCUMENTS

| 2150958 | 4/1973 | Fed. Rep. of Germany . |
| 51-130163 | 3/1976 | Japan . |
| 51-170964 | 6/1976 | Japan . |
| 54-124559 | 9/1979 | Japan . |
| 55-70389 | 5/1980 | Japan . |
| 662504 | 5/1979 | U.S.S.R. . |

*Primary Examiner*—John E. Kittle
*Assistant Examiner*—Hoa Van Le
*Attorney, Agent, or Firm*—Ernest G. Szoke; Henry E. Millson, Jr.

[57] ABSTRACT

Process for regenerating alkaline and neutral phosphate and/or silicate-containing degreasing and cleaning solutions which are contaminated with emulsified mineral and/or natural oils, by treating such contaminated solutions with a controlled quantity of either calcium ions, magnesium ions, or a mixture thereof.

8 Claims, No Drawings

PROCESS FOR REGENERATING CLEANING SOLUTIONS

BACKGROUND OF THE INVENTION

Aqueous solutions containing surfactants and so-called builder-substances, such as alkali hydroxides, alkali carbonates, borates, complexing agents, inorganic and organic corrosion inhibitors, and particularly silicates and/or phosphates are used in industrial degreasing and cleaning operations, particularly in the degreasing and cleaning of metal surfaces. During use they become contaminated with mineral oils and/or natural oils, which may contain emulsifiers, corrosion inhibitors, and other oil additives. The contaminants, which are emulsified by the emulsifier content of the oil and the surfactants in the cleaning solutions, diminish the effectiveness of the cleaning solutions and finally render them ineffective. The cleaning solutions must then be replaced. However, if the spent solutions are alkaline, they must be neutralized and oils must be removed in accordance with existing regulations before they can be discarded. Furthermore, neutralization alone will generally not result in adequate oil separation. Hence, means must be employed to break the emulsion which can be achieved by several methods, e.g. by lowering the pH of the solution to about 1; by treating the solution with salt; or by adding flocculating agents, such as aluminum or iron salts, in the acid range, followed again by neutralization. The components of the cleaning solution are of course lost when the solution, now free of oil, is discarded. Also, treatment of the waste water containing the discarded cleaning solution is generally required. Therefore, it is clearly advantageous to regenerate such spent cleaning solutions so that they can be re-used.

The regeneration of aqueous degreasing solutions can be achieved according to known methods either by means of ultrafiltration or by using centrifugal separators. However, when using centrifugal separators, only those degreasing solutions can be treated in which the oils and contaminants do not form stable emulsions. In addition, this process, like ultrafiltration, requires a considerable quantity of equipment, is time consuming, and is often energy intensive, making such regeneration processes relatively expensive. The reason why such processes have high equipment requirements is that in many instances the contaminants consist not only of organic substances but also of particles that are not soluble in water.

DETAILED DESCRIPTION OF THE INVENTION

Surprisingly, it has now been found that alkaline as well as neutral degreasing and cleaning solutions containing a phosphate and/or a silicate and contaminated with emulsified mineral and/or natural oils can be readily regenerated by chemical means.

The process of the present invention is carried out by adding to the contaminated cleaning solutions either (1) from about 0.3 to about 2 g/l, preferably from about 0.6 to about 1.2 g/l, of calcium ions, (2) from about 0.2 to about 1.2 g/l, preferably from about 0.35 to about 0.7 g/l, of magnesium ions, or (3) a mixture of calcium ions and magnesium ions in amount chemically equivalent to from about 0.3 to about 2 g/l, preferably from about 0.6 to about 1.2 g/l of calcium ions.

As a result of the above treatment, the emulsion is broken, resulting in an oily layer at the top of the solution, which can be readily removed by decantation. Also, a precipitate forms which is readily separated from the aqueous solution by conventional means such as filtration.

The degreasing and cleaning solutions that can be regenerated by the process of the present invention are those that contain at least 1 g/l, and generally from 10 to 50 g/l or higher concentrations, of an alkali metal phosphate and/or an alkali metal silicate. Of course, in the event such solutions contain an alkali metal phosphate and/or an alkali metal silicate, but at a concentration below 1 g/l, such solutions can be treated by the process of the invention by first adding to the cleaning solution a sufficient quantity of alkali metal phosphate and/or alkali metal silicate to bring the concentration thereof to at least about 1 g/l.

The cleaning and degreasing solutions to be regenerated in accordance with the process of this invention have pH values between 7 and 14. They may contain alkaline materials such as alkali metal hydroxides, alkali metal carbonates, and alkali metal borates. They contain as builder substances phosphates such as alkali metal orthophosphates, alkali metal diphosphates or alkali metal polymerized phosphates, and/or alkali metal silicates with a mole ratio of $SiO_2/Na_2O$ or $SiO_2/K_2O$ of about 1:1 to about 4:1, preferably about 2:1 to about 3.5:1. When regenerating these solutions in accordance with this invention by adding calcium and/or magnesium ions, only small amounts of these builder substances are used up and lost. The major portion of the builder substances is available in the cleaning and degreasing solutions after regeneration for further cleaning operations. The term "alkali metal" as used herein is understood to mean sodium or potassium, with sodium preferred. Additionally, the solutions to be regenerated may contain nonionic surfactants in amounts of 0.1 to 5 g/l, preferably 0.5 to 3 g/l, to achieve good degreasing and cleaning action. The presence of anionic surfactants is not recommended because they impair the settlement of the precipitate and the discrete formation of the oil layer. They should, therefore, not be used, or should only be used in lesser amounts than nonionic surfactants.

Particularly suitable as nonionic surfactants and often used in such cleaning and degreasing solutions are adducts of ethylene oxide and propylene oxide with fatty alcohols, fatty acids, or fatty amines, particularly those with 12 to 18 carbon atoms in the alkyl radical, as well as alkylamines wih 6 to 15 carbon atoms. Block polymers of ethylene oxide and propylene oxide are also used for this purpose.

The source of calcium and/or magnesium ions added to the cleaning solution to be regenerated is preferably added as an aqueous solution. As a source of calcium ions, soluble calcium salts are employed, with calcium nitrate and calcium chloride being preferred. As a source of magnesium ions, soluble magnesium salts are employed with magnesium nitrate, magnesium sulfate, and magnesium chloride preferred. The salts may be used individually or as a mixture. The soluble calcium and/or magnesium salts can be added to the contaminated cleaning solution at the operating temperature of the solution or at room temperature, whichever is more convenient. When the solution to be regenerated contains only alkali metal silicates, i.e. does not contain any alkali metal phosphate, a small quantity e.g. from about 4 to about 8 g/l, of aluminum and/or iron (III) ions in the form of soluble salts thereof may be added in addition to the soluble calcium and/or magnesium salts.

After thorough mixing, the precipitate of calcium and/or magnesium phosphates or silicates will settle out and the oils may be readily decanted. In order to improve the rate of sedimentation of the precipitate, a small quantity, e.g. from about 0.05 to about 2 g/m$^3$, of a polyelectrolyte-based flocculating agent, preferably a polyacrylamide, may be added. After decanting the oily layer and removing the precipitate, the cleaning solution may be used again in the same manner as a freshly prepared solution.

Any imbalance in the components of the solution due to the instant regeneration process can be adjusted to give the desired concentration by adding water or by replenishing with fresh components, as needed. Only in rare instances is replenishment with surfactants required. Changes in the pH of the cleaning solutions which might decrease cleaning efficiency do not occur during regeneration.

The regenerating process of the invention may be used for the same cleaning solutions several times as the solution becomes contaminated with fresh contaminants, and the number of regeneration processes that can be employed with the same cleaning solution is only limited by the extent to which salts accumulate in the solution.

The following examples are given for illustration purposes only and are not meant to limit the scope of the invention. When data is given in %, % by weight is meant unless otherwise stated.

EXAMPLE I

A 5% solution of a "silicate cleaner" consisting of
80% sodium metasilicate
16% sodium hydroxide
4% of a combination of adducts of 9 to 14 moles of ethylene oxide with nonylphenol
in which 10 g/l of olive oil was present as a stable emulsion, was mixed with 30 ml/l of a 20% calcium chloride solution, corresponding to 2.16 g/l of calcium ions, and stirred. After a short period of time an oil layer formed on the surface and a calcium silicate precipitate formed on the bottom. After removing the oil layer and decanting the cleaning solution from the precipitate, the cleaning solution which now contained only 110 mg/l of olive oil, was again fully functional.

EXAMPLE II

A 2% solution of a "phosphate cleaner" containing
50% sodium diphosphate
30% sodium orthophosphate
10% sodium triphosphate and
10% adduct of 10 moles of ethylene oxde with nonylphenol,
in which 10 g/l of mineral oil were emulsified, was mixed with 20 ml/l of a 15% magnesium sulfate solution, corresponding to 0.6 g/l of magnesium ions, and stirred.

The sedimentation rate of the precipitate was speeded up by adding to the solution 1 g/m$^3$ of a polyacrylamide flocculating agent (molecular wt. $8 \times 10^6$). After settling of the flakes and removal of the mineral oil layer formed on the surface, the cleaner solution which contained practically no mineral oil, was reusable without further treatment or addition of ingredients.

EXAMPLE III

A 2% solution of the "phosphate cleaner" described in Example II was contaminated with 10 g/l of olive oil in the form of a stable emulsion. 30 ml/l of a 20% calcium nitrate solution, corresponding to 1.46 g/l of calcium ions, was added while stirring, resulting in breaking of the emulsion. After removing the oil and the precipitate, the cleaning solution was again fully functional.

EXAMPLE IV

After standing for a period of 10 days, a neutral cleaning solution consisting of 0.5% sodium diphosphate and 0.5% of an adduct of 10 moles of ethylene oxide and a fatty amine with 12 to 16 carbon atoms, was used to prepare a stable emulsion with 20 g/l of a drilling oil containing mineral oil, petroleum sulfonate, nonionic surfactants, and soap. The emulsion could not be separated in a separator or broken by the addition of 7 g/l of aluminum sulfate which was added to a portion thereof. After adding 30 ml/l of a 20% calcium nitrate solution, corresponding to 1.46 g/l of calcium ions, to the remainder of the emulsion, the emulsion was broken and the mineral oil formed a layer on the surface. After removing the oil layer and the precipitate, only 350 mg/l of drilling oil remained in the cleaning solution, and after replenishment to its initial concentration of active ingredients, it was reused in a new cleaning cycle without loss of effectiveness.

What is claimed is:

1. A process for regenerating an alkaline or neutral aqueous degreasing and cleaning solution containing at least 1 g/l of a phosphate or a silicate, or a mixture thereof, and wherein said solution is contaminated with emulsified mineral oil, natural oil, or a mixture thereof, comprising adding to said contaminated solution either (1) from about 0.3 to about 2 g/l of calcium ions, (2) from about 0.2 to about 1.2 g/l of magnesium ions, or (3) a mixture of calcium ions and magnesium ions chemically equivalent to from about 0.3 to about 2 g/l of calcium ions.

2. A process in accordance with claim 1 wherein the concentration range of calcium ions in (1) and (3) is from about 0.6 to about 1.2 g/l.

3. A process in accordance with claim 1 wherein the concentration range of magnesium ions in (2) is from about 0.35 to about 0.7 g/l.

4. A process in accordance with claim 1, 2 or 3 wherein the source of calcium ions is calcium nitrate, calcium chloride, or a mixture thereof, and the source of magnesium ions is magnesium nitrate, magnesium sulfate, magnesium chloride, or a mixture of two or more of the foregoing magnesium compounds.

5. A process in accordance with claim 1, 2 or 3 in which said solution contains at least one alkali metal silicate and is free of phosphate and wherein from about 4 to about 8 g/l of either (i) a soluble salt of aluminum, (ii) a soluble salt of ferric iron, or (iii) a mixture of a soluble salt of aluminum and a soluble salt of ferric iron, is also added to the contaminated degreasing and cleaning solution.

6. A process in accordance with claim 1, 2 or 3 wherein a polyelectrolyte-based flocculating agent is added to the solution.

7. A process in accordance with claim 1, 2 or 3 wherein the contaminated degreasing and cleaning solution also contains from about 0.1 to about 5 g/l of a nonionic surfactant.

8. A process in accordance with claim 1, 2 or 3 wherein the resulting oily layer and precipitate are removed from the regenerated degreasing and cleaning solution.

* * * * *